Figure 1:
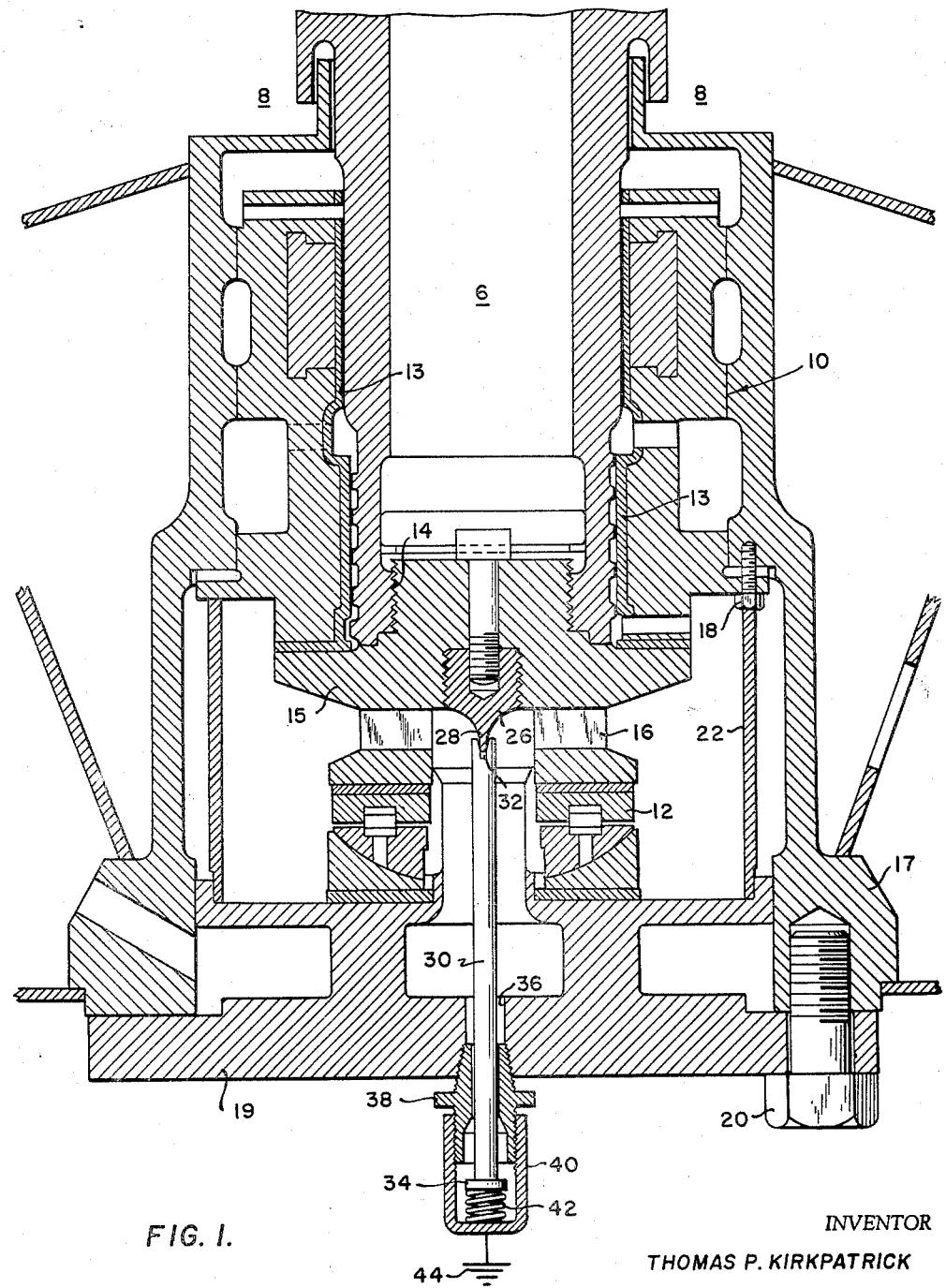

June 15, 1965 T. P. KIRKPATRICK 3,189,791
GROUNDING DEVICE FOR ROTATING MACHINERY, ESPECIALLY FOR BLOWERS
Filed Nov. 29, 1960 2 Sheets-Sheet 1

INVENTOR
THOMAS P. KIRKPATRICK

BY
ATTORNEY

June 15, 1965  T. P. KIRKPATRICK  3,189,791
GROUNDING DEVICE FOR ROTATING MACHINERY, ESPECIALLY FOR BLOWERS
Filed Nov. 29, 1960  2 Sheets-Sheet 2

INVENTOR
THOMAS P. KIRKPATRICK

BY
ATTORNEY

United States Patent Office 3,189,791
Patented June 15, 1965

3,189,791
GROUNDING DEVICE FOR ROTATING MACHINERY, ESPECIALLY FOR BLOWERS
Thomas P. Kirkpatrick, Anne Arundel County, Md., assignor to the United States of America as represented by the Secretary of the Navy
Filed Nov. 29, 1960, Ser. No. 72,537
2 Claims. (Cl. 317—2)
(Granted under Title 35, U.S. Code (1952), sec. 266)

The invention described herein may be manufactured and used by or for the Government of the United States of America for governmental purposes without the payment of any royalties thereon or therefor.

This invention generally relates to a contact device for the passage of current between a rotary shaft and an external circuit; and particularly relates to a means for grounding or measuring undesired or stray electrical voltages generated in the mechanical parts of a high speed rotary machine; and more specifically relates to the protection of a steam-driven, high-speed, forced draft blower against bearing failures caused by stray and similar voltages within the blower.

The rotor part of a high speed rotary machine is usually supported from the stator or stationary part of the machine by the machine's bearings which are lubricated by an electricity-insulating substance, such as for example, oil. Because of this insulation, "static" or "stray" voltages have frequently been found to exist between the rotor and stator, or between the rotor and ground during operation of the machine. These voltages establish arcs or current flow through the lubricating oil, which cause bearing deterioration and failure. Such bearing damage has been particularly troublesome in connection with certain high-speed turbine blowers.

Attempts have been made to avoid this cause of bearing failure in such blowers by providing a direct conductive path for current to flow between the rotor and ground, the path being provided by a grounding contact device comprising a brush riding on a cylindrical surface of the rotor. Previous grounding contact devices that have been used usually consist of carbon brushes fitted against an exposed section of the shaft located between the lower turbine gland seal and the oil sump. These brushes have not been too satisfactory for a number of reasons, but primarily because water, high temperatures, and high rubbing speed affect their efficiency. Additionally difficult accessibility renders proper maintenance of the brushes almost impossible.

An object of the invention is the provision of an improved grounding device for use with a rotating shaft, and especially the shaft of a turbine-driven blower.

A further object of the invention is the provision of an eltctrical circuit so associated with a rotor of a rotary machine that stray voltages will be drained from the rotor through a path that excludes the bearings of the rotor.

A further object is to provide a novel grounding device of a type described which maintains contact with the rotor shaft regardless of shaft vibration, so that stray voltages will be constantly drained away, or can be accurately measured.

A further object of the invention is the provision of a grounding contact device for a rotating shaft so placed as to provide a low rubbing speed and a minimum linear velocity between the device and shaft.

Figure 2:
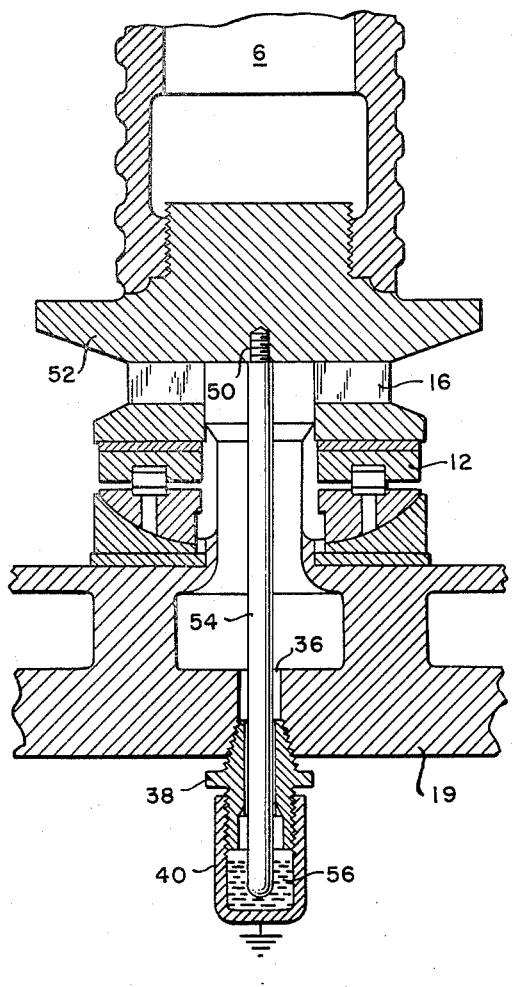
Figure 3:
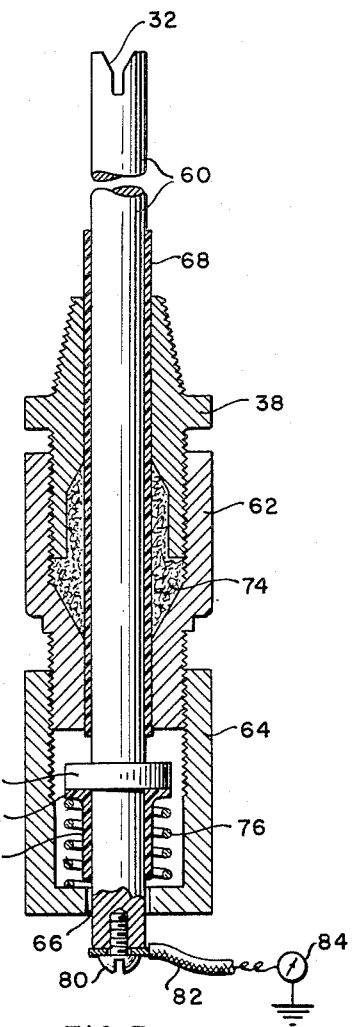

Other objects and many of the attendant advantages of this invention will be readily appreciated as the same becomes better understood by reference to the following detailed description when considered in connection with the accompanying drawings wherein like numbers indicate like parts; and FIG. 1 is a longitudinal sectional view of the lower rotor section of a vertical forced draft blower provided with a contact device in accordance with the invention;

FIG. 2 is a longitudinal sectional view of the lower part of a blower in accordance with a modified form of the invention; and FIG. 3 is a longitudinal sectional elevational view, partly in section, of another modification of a contact device in accordance with the invention.

Generally stated, the invention is practiced by providing a contact device disposed in contact with an end of the shaft and through which electric charges on the shaft may be drained. The device includes a contact member maintained in electrical contact with the center of the end of the shaft so that the contact is not subject to disengagement from the shaft by vibrations of the shaft or longitudinal movement of the shaft, and so that relative movement of the shaft and contact is kept to a minimum.

Referring now to FIG. 1, there is shown a lower portion of a rotor assembly of a steam-driven forced draft blower of a known type. The blower comprises a rotor comprising a hollow metal shaft 6 which carries a driving steam turbine, not shown, at its upper end. The rotor 6 passes through an oil reservoir 8 and is rotatably supported by means including a metallic radial bearing 10 and a lower annular metallic thrust bearing 12 of the Kingsbury type. The bearings are usually electrically grounded through the stationary metallic parts of the machine.

In the particular embodiment referred to, the radial bearing 10 is of the tilting pad design using four symmetrically spaced shoes and has bearing material 13, such as babbitt, lining the bearing. The lower thrust bearing 12 is a three shoe tilting pad bearing, and is mounted in a spherical seat so that it may move about slightly to compensate for very small displacements of shaft 6.

As shown in FIG. 1, the hollow shaft 6 is formed with an internally threaded bore 14 at its lower end. A metal end cap 15, having exterior threads thereon, is threadedly received in the bore 14 and bears on the thrust bearing 12 through intermediate metallic members 16.

Surrounding the lower end of the rotor shaft 6 and the thrust and radial bearings 10 and 12 is a metallic thrust bearing cage 17 having an open lower end. A plurality of circumferentially spaced bolts 18 pass through a flange of bearing 10 and are received in an intermediate shoulder of the thrust bearing cage 17 to hold the radial bearing 10 in position against vertical displacement. A bottom metal enclosure 19 covers the open lower end of thrust bearing cage 17 and is held in position by a plurality of circumferentially spaced bolts 20 threadedly received in the lower end of the thrust bearing cage. As a further guard, a cylindrical shield 22 is placed about the thrust bearing and inside the cage 17.

In accordance with the invention, the center of the lower face of the end cap 15 is provided with an internally threaded hole that receives an exteriorly threaded metal nut 26 having generally conical point 28 extending axially therefrom. A contact member 30, made from a suitable conducting material such as bronze or copper for example, is formed with a recess 32 adapted to bear against point 28 at its upper end, and with a shoulder 34 slightly above its lower end.

The recess 32 is generally conical but with a cylindrical apex which receives the extreme tip of point 28. The contact member 30 extends downwardly from point 28 through a central passageway including a threaded hole 36 formed in the bottom enclosure 19.

The hole 36 has threaded therein the upper end of a tubular insert on gland 38. The lower end of this gland 38 is closed by a removable cup 40 which encompasses the lower end of contact member 30. The cup 40 also encloses a compression coil spring 42 which bears against the closed end of the cup and the lower surface of shoulder 34 of contact member 30. The insert or gland 38, cup 40, and spring 42 are all formed of metal so as to provide ready conduction of electricity therethrough. Since strength is not a factor in the design of these parts, they may be made of copper if desired, instead of steel which may also be used. The cup 40 is grounded, preferably through the machine itself or through a separate conductor. Such grounding is indicated schematically at 44.

In operation of the machine indicated in FIG. 1, when steam is admitted to the turbine carried by shaft 6, the shaft rotates at a high speed. This rotation of the shaft 6 causes blower blades which are on the shaft but not shown to create a forced air draft in accordance with conventional practice.

During rotation of the shaft, it has been found that voltages may develop between the shaft and ground or between the shaft and the stator. It is believed that air passing through the blower portion of the machine or steam passing through the turbine portion of the machine, or both, create electric charges that accumulate on the shaft 6, producing a voltage with respect to ground or the stator unless the charges can be drained off. The voltages may be generated frictionally, electrostatically or electromagnetically, and may exhibit reversals of polarity under changing conditions in the blower portion, and at times erratic wave forms. The drainage of the charges off to ground is interfered with by the insulating oil film between the rotary shaft 6 and its bearings. The oil film may be said to provide a high resistance to the passage of current between the shaft and ground or the stator. This resistance also varies under dynamic loading of the machine because of pressure variations, or vibration displacement of the relative positions of the shaft and bearings or for other reasons. In any event it has been found that any voltage build-up between the shaft and bearings or ground causes arcing or current-flow between them that is detrimental to the rubbing surfaces of the shaft and bearings.

The invention provides a shunt or alternate path for current to pass to or from the shaft, this path excluding the bearings. Consequently, damage to the bearings by stray voltages or currents does not occur. In the embodiment shown in FIG. 1, the path is entirely of metal, and extends from shaft 6, cap 15, nut 26, point 28 of the nut rotating in recess 32, the wall of recess 32 which is pressed against point 28 by spring 42, the contact member 30, spring 42, and grounded cup 40.

Because the point 28 and recess 32 are at substantially the exact center or axis of the rotor system, the linear velocity between them is small, so that contact is continuously maintained between them with little, if any disturbing influence. Preferably, the amount of clearance or play of the contact member 30 in the hole of gland nut 38 should be small, and the hole should be relatively long. In a sense the upper end of the contact member 30 is more or less free in space so that it immediately adjusts to any slight displacements of the point 28 that may occur because there is a pressure force always acting to hold the two in contact. Axially this force is provided by the spring 42 on shaft 6; and radially by the point 28 pressing against the contact member 30 at recess 32.

No lubricant is necessary between the point 28 and contact member 30, but if desired an electricity conducting lubricant such as certain known forms of graphite may be used.

In the embodiment of FIG. 2, which is preferred, there is illustrated another means of grounding the shaft 6. An internally tapped hole 50 is formed at the exact center of the lower face of an end cap 52 secured in the shaft 6. The upper end of a contact member 54 is exteriorly threaded and is threadedly fastened in hole 50. The lower portion of contact member 54 extends through hole 36 formed in bottom enclosure 19, through the internal bore or hole of insert or gland 38 threadedly received in hole 36, and into a pool of mercury 56 contained in stationary cup 40. In this embodiment, the contact member 54 rotates with shaft 6, with the lower end of the contact member rotating in the mercury pool 56. The voltage built up between the rotating shaft 6 and ground is dissipated to ground through end cap 52, contact member 54, mercury pool 56, and cup 40 to ground.

The invention also permits the nature and magnitude of the electrical phenomena involved to be investigated. To this end, a means is provided of insulating the contact member from ground or stator potential. This may be accomplished by the embodiment disclosed in FIG. 3 which shows a device which may be used to accomplish either the grounding of or measuring of potentials developed on the rotating shaft.

With reference to FIG. 3, a circular contact member 60, similar to contact member 30 of FIG. 1 except for its lower end, is provided. The contact member 60 has a recess 32 that engages a pointed nut such as nut 26 shown in FIG. 1 and a shoulder or flange 61 near its lower end similar to the shoulder 34 of FIG. 1.

The contact member 60 is internally received in the internal bore of the threaded insert or gland 38. The lower end of insert 38 threadedly receives the upper end of an internally threaded packing-compressing member 62. Exterior threads on the lower end of packing compressing member 62 receive an internally threaded cup 64 having a central oversize hole 66 in its bottom. The lower portion of contact member 60 extends through and beyond this hole with ample clearance.

To maintain the contact member insulated from ground or stator potential, a sleeve of suitable insulating material, for example polyethylene, is attached to and about the contact member 60 wherever necessary. As shown in FIG. 3 an insulating sleeve is provided at 68 between the insert 38 and packing-compressing member 62 on the one hand and contact member 60 on the other. An insulating sleeve 70 is also attached to the lower end of contact member 60, the sleeve having a flange 72 along the bottom surface of flange 61.

To prevent leakage of oil from the oil reservoir 8, shown in FIG. 1, packing 74 is provided along the contact member 60 and insulating material 68, which may be compressed into position by packing-compressing member 62.

A spring 76 is provided about sleeve 70, the spring bearing against the bottom of cup 64 and flange 72 of insulating sleeve 70.

The lower end of the contact member 60 is provided with a threaded hole adapted to receive a screw 80 so that a suitable conductor 82 may be attached to the lower end of the contact member 60.

Charges developed on shaft 6 are conducted by conductor 82 to a control or measuring device or instrument 84.

Thus it is seen that a novel means is provided for grounding or measuring stray voltages developed in the machine. This means insures a positive and constant engagement between the contact member and the rotating shaft, is not subject to extreme friction, is not adversely affected in operation by vibration, has low rubbing contact between the contact member and the rotating shaft and is easy to maintain.

Obviously many modifications and variations of the present invention are possible in the light of the above teachings. It is therefore to be understood that within the scope of the appended claims the invention may be practiced otherwise than as specifically described.

What is claimed is:
1. In a high speed rotary machine;
   a hollow shaft;
   a metallic end cap secured to an end of said shaft;
   said end cap terminating in a conical point along the rotating axis of the said shaft;
   a contact member having a recess at one end;

a flange just short of the other end of the said contact member;

a cup secured around the said contact member;

a spring between the said cup and flange maintaining the said conical point in engagement with the said contact member within the said recess whereby the end cap and contact member are in electrical contact; and means for allowing the contact member to be connected to ground.

2. A device as described in claim 1 wherein the shaft is within an oil reservoir;

insulating means are about the outer portion of the contact member and flange;

packing means surround the contact member and insulating means for preventing leakage of oil from the reservoir; and control means between the contact member and ground.

References Cited by the Examiner
UNITED STATES PATENTS

| | | | |
|---|---|---|---|
| 1,651,983 | 12/27 | Zimmerman | 317—2 |
| 2,104,800 | 1/38 | Grandy | 317—2 |
| 2,256,118 | 9/41 | Kyropoulos | 317—2 |
| 2,560,940 | 7/51 | Findley | 339—118 |
| 2,896,732 | 7/59 | Maurice et al. | 317—2 |
| 2,942,187 | 6/60 | Erath et al. | 324—109 |

SAMUEL BERNSTEIN, *Primary Examiner.*